United States Patent [19]

Uemura et al.

[11] Patent Number: 5,181,979
[45] Date of Patent: Jan. 26, 1993

[54] PROCESS FOR PREPARING CARBON/CARBON COMPOSITE

[75] Inventors: Seiichi Uemura; Yoshio Sohda, both of Tokyo; Osamu Kato, Kanagawa; Takefumi Kouno, Kanagawa; Tsutomu Kihara, Kanagawa, all of Japan

[73] Assignee: Nippon Oil Company, Limited, Tokyo, Japan

[21] Appl. No.: 682,030

[22] Filed: Apr. 8, 1991

[30] Foreign Application Priority Data

Apr. 6, 1990 [JP] Japan .................................. 2-90175

[51] Int. Cl.$^5$ ............................................. C01B 31/02
[52] U.S. Cl. ...................................... 156/89; 156/242; 264/29.5; 264/29.7; 423/447.4; 423/447.7; 423/447.8; 427/228; 427/229
[58] Field of Search .................... 264/29.1, 29.5, 29.6, 264/29.7, 136, 137, 257, 258; 156/89, 155, 242, 245; 423/445, 447.1, 447.4, 447.7, 447.8, 448, 449; 427/226, 227, 228, 384

[56] References Cited

U.S. PATENT DOCUMENTS 3,462,289 8/1969 Rohl et al. .......................... 427/228
4,412,675 11/1983 Kawakubo ...................... 423/449 X

FOREIGN PATENT DOCUMENTS 2505886 8/1975 Fed. Rep. of Germany ..... 264/29.1

*Primary Examiner*—Leo B. Tentoni
*Attorney, Agent, or Firm*—Scully, Scott, Murphy & Presser

[57] ABSTRACT

A carbon/carbon composite is prepared by mixing 100 parts of a carbonaceous pitch with 1-45 parts by weight of at least one aromatic compound containing at least one functional group selected from nitro and hydroxyl groups, then impregnating a bundle of carbon fibers with the resulting mixture, thereafter carbonizing the thus-impregnated carbon fiber bundle under pressure or under pressing, and if necessary, further carbonizing the thus-carbonized carbon fiber bundle at atmospheric pressure.

11 Claims, No Drawings

PROCESS FOR PREPARING CARBON/CARBON COMPOSITE

BACKGROUND OF THE INVENTION

The present invention relates to a process for preparing a carbon/carbon composite.

A carbon/carbon composite is a material having superior properties, for example, maintaining high strength and high elastic modulus and exhibiting only a small thermal expansion coefficient in an inert gas atmosphere even at high temperatures higher than 1,000° C. Its utilization as parts of aeronautic and space machinery and devices, brakes, furnace materials, etc. is expected.

However, in the case where a unidirectional laminate, a two-dimensional textile laminate, a mat-like laminate, or a felt-like laminate, is used as a reinforcing fiber for the carbon/carbon composite, if there is used a conventional carbonaceous matrix, there will occur a ply separation under a strong bending stress, thus resulting in that the breaking strength of the composite is deteriorated.

In order to eliminate such drawback there has been made an attempt of using a three-dimensional fabric as a reinforcing fiber for the carbon/carbon composite. In this case, however, a complicated process involving a long manufacturing time is required.

It is the object of the present invention to overcome the above-mentioned problem and provide a simple process capable of preparing a high strength carbon/carbon composite without ply separation.

SUMMARY OF THE INVENTION

The present invention resides in a process for preparing a carbon/carbon composite, which process comprises mixing 100 parts by weight of a carbonaceous pitch with 1-45 parts by weight of at least one aromatic compound containing at least one functional group selected from nitro and hydroxyl groups, then impregnating a bundle of carbon fibers with the resulting mixture, thereafter carbonizing the thus-impregnated carbon fiber bundle under pressure or under pressing, and if necessary, further carbonizing the thus-carbonized carbon fiber bundle at atmospheric pressure.

DETAILED DESCRIPTION OF THE INVENTION

The present invention will be described in more detail hereinunder.

The "carbon/carbon composite" as referred to herein represents a material comprising a carbon fiber and a carbonaceous matrix.

As examples of the said carbon fiber there are mentioned various carbon fibers, including pitch-, polyacrylonitrile- or rayon-based carbon fibers. Particularly, pitch-based carbon fibers are preferred, and pitch-based carbon fibers prepared using an optically anisotropic pitch are most preferred.

For preparing a pitch-based carbon fiber there may be used a suitable known process. For example, out of coal-or petroleum-based pitches ranging in softening point from 100° to 400° C., preferably 150° to 350° C., there is used an optically isotropic or anisotropic pitch, particularly preferably an optically anisotropic pitch having an optically anisotropic phase content of 60–100 vol%, most preferably 80–100 vol%. First, the pitch is subjected to melt spinning into a pitch fiber according to a conventional process, then the pitch fiber is rendered infusible at a temperature usually in the range of 50° to 400° C, preferably 100° to 350° C., followed by a carbonization treatment usually at 800°–3,000° C. in an inert gas atmosphere. As the oxidizing gas there may be used, for example, air, oxygen, nitrogen oxide, sulfur oxide, or halogen, each alone or in a suitable combination.

In the present invention, the carbon fiber is used usually as a bundle of 500 to 25,000 fibers, which fiber bundle is in the form of a unidirectional laminate, a two-or three-dimensional fabric, a mat-like shaped article, a felt-like shaped article, or a laminate using any of such shaped articles and laminates.

The carbonaceous matrix used in the present invention is prepared by mixing an aromatic compound containing nitro and/or hydroxyl group with a carbonaceous pitch and then carbonizing the resulting mixture as a precursor.

As the aromatic compound containing nitro and/or hydroxyl group there usually is employed a compound of the following geneal formula (1) or (2):

As the aromatic compound containing nitro and/or hydroxyl group there usually is employed a compound of the following general formula (1) or (2):

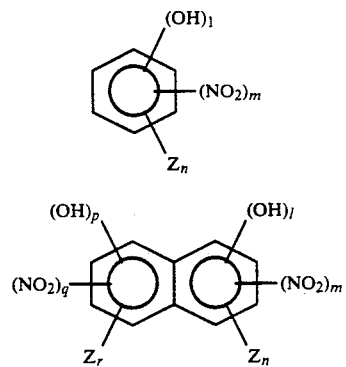

wherein Z represents an organic group, e.g. alkyl group, having 1 to 4 carbon atoms, COOH, or CHO; l, m, p and q are each an integer of 0 to 3 and $1 \leq l+m \leq 3$ in formula (1), $1 \leq l+m+p+q \leq 3$ in formula (2); n and r are each an integer of 0 to 2.

As examples of the said aromatic compound there are mentioned nitrobenzene, dinitrobenzene, dinitronaphthalene, trinitronaphthalene, dinitrobenzoic acid, dinitronaphthoaldehydes, catechol, tert-butyl catechol, hydroxyquinone, naphthol, dihydroxynaphthalene, and methylnaphthols. These aromatic compounds may be used each alone or as a mixture of two or more.

As the carbonaceous pitch, a coal- or petroleum-based pitch is employable. Preferred examples are those ranging in softening point from 100° to 400° C., preferably 150° to 350° C.

Optically isotropic or anisotropic pitches are also employable each alone or as a mixture. Particularly preferred are optically anisotropic pitches having an optically anisotropic phase content of 60 to 100 vol%, most preferably 80 to 100 vol%.

A mixture obtained by mixing 100 parts by weight of the carbonaceous pitch with 1–45, preferably 5–35, parts by weight of the aromatic compound containing nitro and/or hydroxyl group is used as a precursor of the carbonaceous matrix.

If the proportion of the aromatic compound containing nitro and/or hydroxyl group is outside the above range, there will not be attained the effect of preventing ply separation and improving the bending strength The following description is now provided about how to prepare the carbon/carbon composite of the invention using a bundle of carbon fibers and the precursor of the carbonaceous matrix.

First a bundle of carbon fibers is impregnated with the carbonaceous matrix precursor. This impregnation is performed by heat-melting the said precursor under reduced pressure. Suitable conditions for the impregnation can be selected according to properties of the carbonaceous matrix used. But it is desirable that the impregnation under reduced pressure be followed by the application of pressure in an atmosphere of an inert gas, e.g. $N_2$.

With a view to reducing the viscosity in the impregnation and thereby facilitating the impregnation, there may be used a solvent for dilution such as, for example, an aromatic hydrocarbon, pyridine, or quinoline.

Then, the thus-impregnated carbon fiber bundle is carbonized under pressure or under pressing, and if necessary, further carbonized at atmospheric pressure, whereby there is obtained the carbon/carbon composite of the invention.

The carbonization under pressure can be carried out by heating to 400°-2,000° C. under isotropic pressurization at 50-10,000 kgf/cm$^2$ using an inert gas.

The carbonization under pressing is performed by heating to 400°-2,000° C. under uniaxial pressing at 10-500 kg/cm$^2$ using a hot press.

There also may be used an HIP (hot isostatic pressing) apparatus for the carbonization. Pressure and heating conditions in the HIP apparatus involve pressurizing to 50-10,000 kg/cm$^2$, preferably 200-2,000 kg/cm$^2$, using an inert gas, and heating to 100°-3,000° C., preferably 400°-2,000° C. As a pressure medium gas there may be used an inert gas such as argon, nitrogen, or helium.

The carbonization at atmospheric pressure, which is conducted as necessary after the carbonization under pressure or under pressing, can be carried out at 400°-3,000° C. in an inert gas atmosphere.

The volume content of the carbon fibers in the carbon/carbon composite prepared in the above manner can be determined optionally according to purposes, but preferably it is in the range of 5% to 70%.

The carbon/carbon composite prepared according to the process of the present invention has a high strength without destruction caused by ply separation.

EXAMPLES

The following examples are given to further illustrate the present invention, but the invention is not limited thereto.

EXAMPLE 1

95 parts by weight of an optically anisotropic pitch having a softening point of 260.C and an optically anisotropic phase content of substantially 100% was mixed with 5 parts by weight of tert-butyl catechol.

Then, a laminate of a two-dimensional fabric (plain weave) formed using a bundle of pitch-based carbon fibers having an elastic modulus of $40 \times 10^3$ kgf/mm$^2$ and a diameter of 10 82m was laminated with the resultant mixture at 350° C. The impregnation was carried out by heating the mixture to 350° C. at a reduced pressure of 5 mmHg, holding it in this state for 2 hours, then pressurizing to 5.5 kg/cm$^2$ using $N^2$ gas, holding the mixture in this state for 1 hour, followed by slow cooling and release to atmospheric pressure.

The thus-impregnated laminate was hot-pressed at 600° C. under a pressure of 130 kg/cm$^2$ and then carbonized at 800° C. for 12 hours while pressurizing to 1,000 kg/cm$^2$ using argon gas to obtain a carbon/carbon composite.

The carbon/carbon composite thus obtained was subjected to a three-point bending test according to ASTM D790. As a result, it was found to have a bending strength of 40 kgf/mm$^2$, and destruction occurred from the pulling side, with no ply separation observed.

COMPARATIVE EXAMPLE 1

The same laminate as that used in Example 1 was impregnated with only the optically anisotropic pitch used in Example 1. The thus-impregnated laminate was then subjected to hot pressing and carbonization under pressure in the same way as in Example 1 to obtain a carbon/carbon fiber.

This carbon/carbon composite was subjected to a bending test in the same manner as in Example 1. As a result, it exhibited a bending strength of 27 kgf/mm$^2$, and destruction was caused by ply separation.

COMPARATIVE EXAMPLE 2

95 parts by weight of the optically anisotropic pitch used in Example 1 was mixed with 5 parts by weight of methylnaphthalene, then the same laminate as that used in Example 1 was impregnated with the resultant mixture. The thus-impregnated laminate was then subjected to hot pressing and carbonization under pressure to obtain a carbon/carbon composite.

This carbon/carbon composite was subjected to a bending test in the same manner as in Example 1. As a result, it exhibited a bending strength of 23 kgf/mm$^2$, and destruction was caused by ply separation.

EXAMPLE 2

85 parts by weight of the optically anisotropic pitch used in Example 1 was mixed with 15 parts by weight of dinitronaphthalene, then the same laminate as that used in Example 1 was impregnated with the resultant mixture after dilution using benzene. The thus-impregnated laminate was hot-pressed at 600° C. and at a pressure of 200 kg/cm$^2$, then carbonized under pressure in the same manner as in Example 1 to obtain a carbon/carbon composite.

This carbon/carbon composite was then subjected to a bending test in the same way as in Example 1. As a result, it was found to have a bending strength of 38 kgf/mm$^2$, and destruction occurred from the pulling side, with no ply separation observed

EXAMPLE 3

80 parts by weight of the optically anisotropic pitch used in Example 1 was mixed with 20 parts by weight of nitrobenzoic acid, then the same laminate as that used in Example 1 was impregnated with the resultant mixture after dilution using benzene. The thus-impregnated laminate was then hot-pressed at 600° C. and at a pressure of 200 kg/cm$^2$, then carbonized under pressure in the same manner as in Example 1 to obtain a carbon/carbon composite.

This carbon/carbon composite was subjected to a bending test in the same way as in Example 1. As a result, it was found to have a bending strength of 36 kgf/mm², and destruction occurred from the pulling side, with no ply separation observed.

What is claimed is:

1. A process for preparing a carbon/carbon composite, which process comprises mixing 100 parts of a carbonaceous pitch with 1 to 45 parts by weight of at least one aromatic compound containing at least one functional group selected from the group consisting of nitro and hydroxyl groups, then impregnating a bundle of carbon fibers with the resulting mixture, thereafter carbonizing the thus-impregnated carbon fiber bundle under pressure and optionally, further carbonizing the thus-carbonized carbon fiber bundle at atmospheric pressure.

2. A process as set forth in claim 1, wherein said aromatic compound is a compound represented by the following general formula (1) or (2):

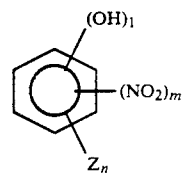
(1)

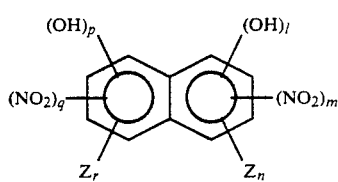
(2)

where Z is an alkyl group, having 1 to 4 carbon atoms, COOH, or CHO; l, m, p and q are each an integer of 0 to 3 and $1 \leq l+m \leq 3$ in the formula (1), $1 \leq l+m+p+q \leq 3$ in the formula (2); n and r are each an integer of 0 to 2.

3. A process as set forth in claim 2, wherein said aromatic compound is nitrobenzene, dinitrobenzene, dinitronaphthalene, trinitronaphthalene, dinitrobenzoic acid, dinitronaphthoaldepyde, catechol, tert-butyl catechol, hydroxyquinone, naphthol, dihydroxynaphthalene, or methylnaphthol.

4. A process as set forth in claim 1, wherein the amount of said aromatic compound used is 5-35 parts by weight based on 100 parts by weight of said carbonaceous pitch.

5. A process as set forth in claim 1, wherein said carbonaceous pitch is a coal- or petroleum-based, optically anistoropic pitch having a softening point of 100-400° C. and an optically anisotropic phase content of 60-100 vol%.

6. A process as set forth in claim 1, wherein said carbon fiber bundle is used in the form of a unidirectional laminate, a two- or three-dimensional fabric, a mat- or felt-like shaped article or a laminate including plies of at least two of said unidirectional laminate, said fabric and said shaped article.

7. A process as set forth in claim 2, wherein the carbonization under pressure is carried out by heating to a temperature of 400° to 2,000° C. under isotropic pressurization at 50-10,000 kg/cm² using an inert gas.

8. A process as set forth in claim 1, wherein the carbonization under pressing is carried out by heating to a temperature of 400° to 2,000° C. under uniaxial pressing at 10-500 kg/cm².

9. A process as set forth in claim 1, wherein the carbonization under pressure is carried out by heating to a temperature of 100-3,000° C. and pressurizing to 50-10,000 kg/cm² using inert gas by means of a hot isostatic pressing apparatus.

10. A process as set forth in claim 1, wherein the volume content of the carbon fibers in the carbon/carbon composite is about 5 to 70 %.

11. A process as set forth in claim 1, wherein the carbonization which is optionally performed at atmospheric pressure after the carbonization under pressure is carried out at a temperature of 400° to 3,000° C. in an inert gas atmosphere.

* * * * *

UNITED STATES PATENT AND TRADEMARK OFFICE
CERTIFICATE OF CORRECTION

PATENT NO. : 5,181,979

DATED : 01/26/1993

INVENTOR(S) : Seiichi Uemura, et al

It is certified that error appears in the above-identified patent and that said Letters Patent is hereby corrected as shown below:

Col. 3, line 66, "10 82m" should read as --10 µm--

Col. 4, line 55, after "observed" insert --.--

Col. 6, line 31, Claim 9: after "using" insert --an--

Signed and Sealed this

Twenty-first Day of December, 1993

Attest:

BRUCE LEHMAN

Attesting Officer    Commissioner of Patents and Trademarks